UNITED STATES PATENT OFFICE.

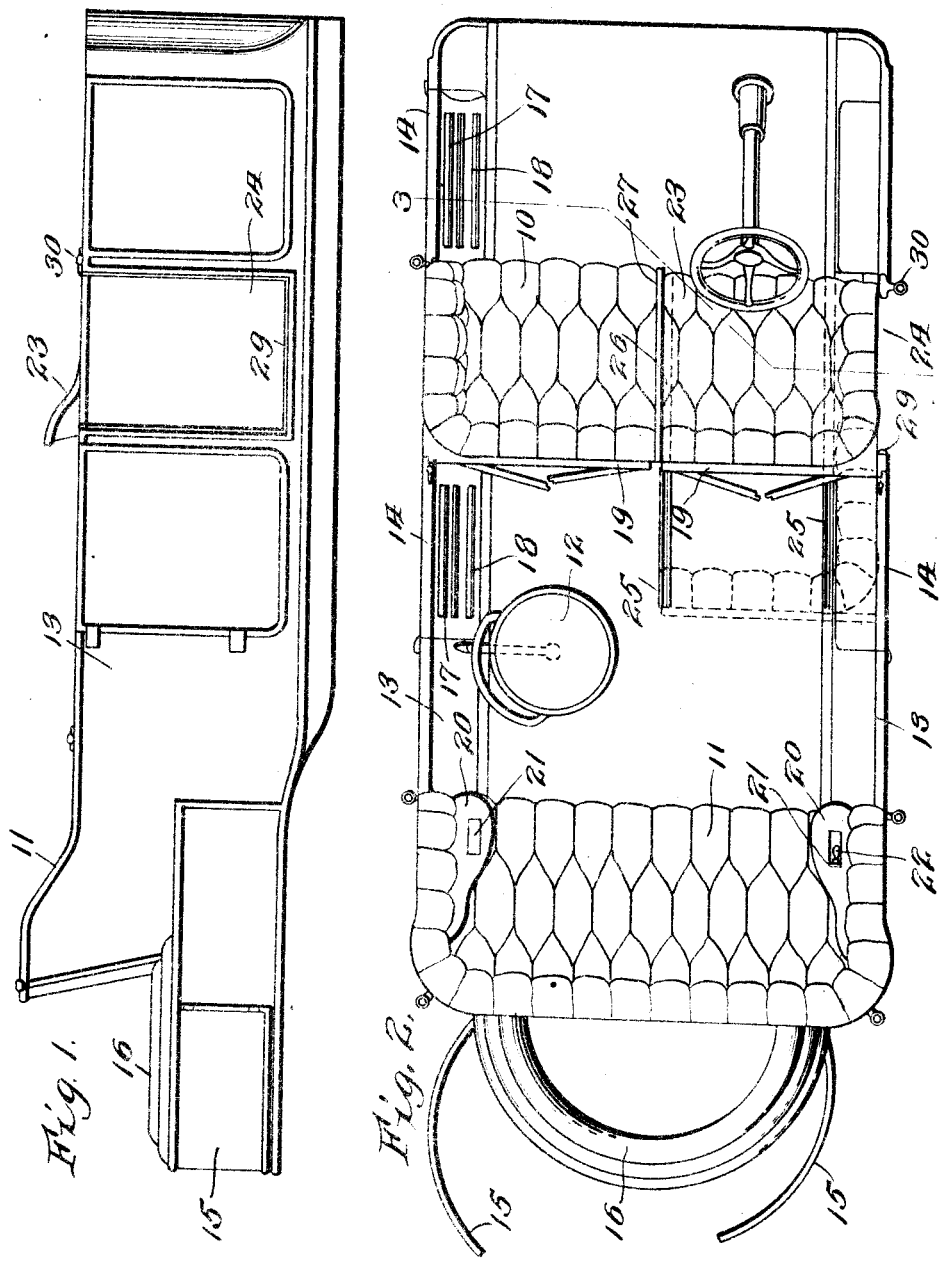

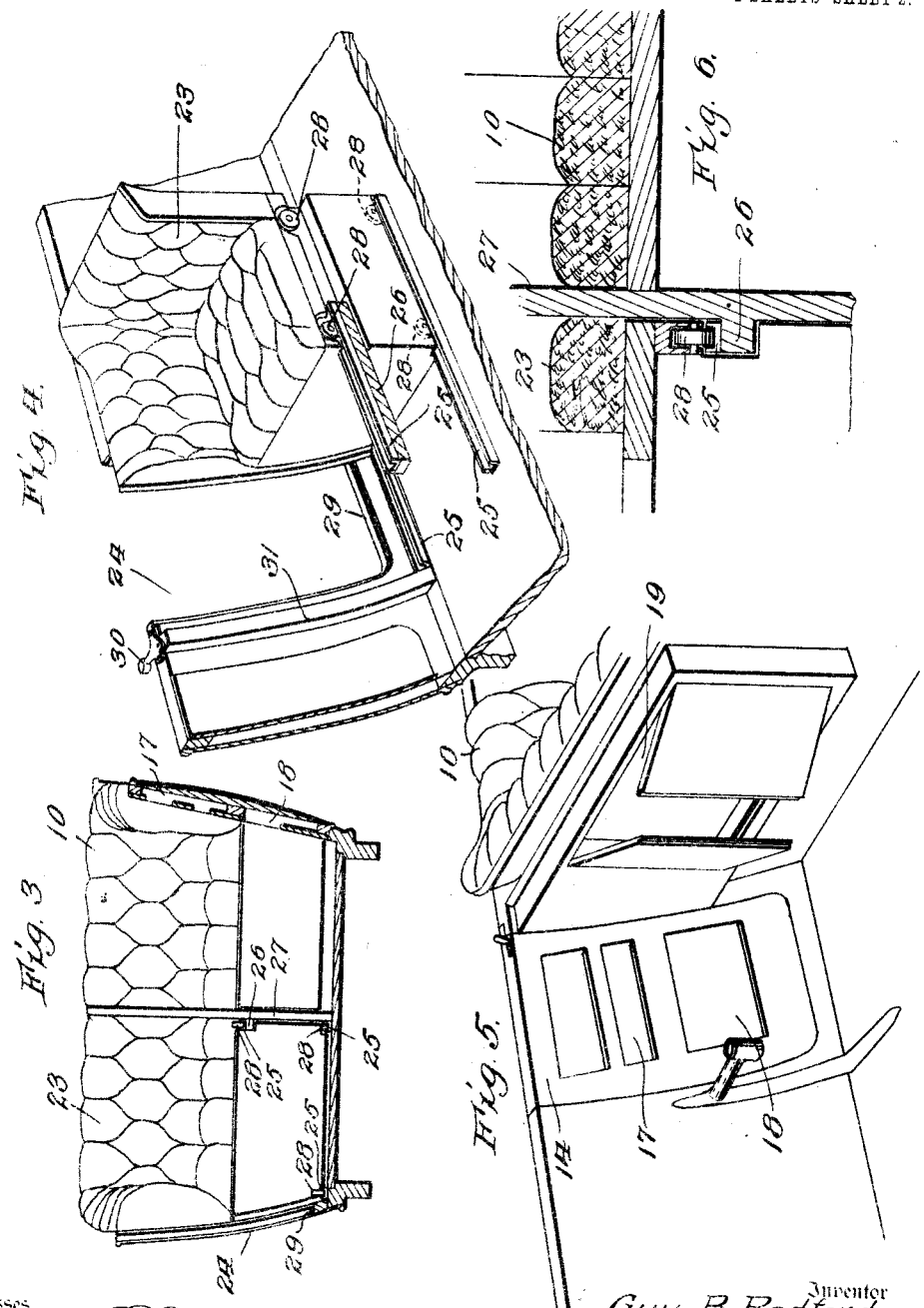

GUY B. RADFORD, OF NEW YORK, N. Y.

VEHICLE-BODY.

1,055,794.  Specification of Letters Patent.  Patented Mar. 11, 1913.

Application filed December 2, 1911. Serial No. 663,533.

*To all whom it may concern:*

Be it known that I, GUY B. RADFORD, a citizen of the United States, residing at New York, in the county of New York and State of New York, have invented certain new and useful Improvements in Vehicle-Bodies; and I do hereby declare the following to be a full, clear, and exact description of the invention, such as will enable others skilled in the art to which it appertains to make and use the same.

My invention relates to vehicle bodies and more particularly to those of the touring type and has for an object to provide means whereby the operator or driver may get from his seat without annoying the passengers of the car or difficult climbing about the steering wheel and levers adjacent his seat when in normal position.
Another object of my invention is the construction of a body having a chamber built at the rear thereof which chamber is formed under the rear seat of said body and having a portion extending slightly beyond the back thereof.

A further object of my invention is the utilization of available spaces about said car for lockers.

Further objects will be apparent from the following specification, appended claims and drawings in which:—

Figure 1 is a side elevation of a body constructed in accordance with my invention. Fig. 2 is a plan view thereof showing the driver's seat moved rearwardly by dotted lines. Fig. 3 is a cross sectional view through the body as on the line 3—3 of Fig. 2. Fig. 4 is a perspective view of a portion of the body showing the driver's seat moved rearwardly and showing the support for one side thereof in section. Fig. 5 is a perspective view of a portion of the car showing one of the doors and one of the lockers. Fig. 6 is a sectional view through a portion of the driver's seat showing the mounting of the anti-friction rollers.

In automobile bodies of the present type it is very inconvenient for the driver to get from his seat as in starting the engine when a passenger occupies the seat next to him without disturbing the passenger to quite an extent. Also in the construction of automobile bodies of the present type no provision is made for the accessories usually carried by an automobile body.

My invention is to provide a body having a rearwardly slidable seat for the driver and to have the seat so constructed as to close the opening through which the driver may pass when the seat is in its forward position.

I provide a body bearing a resemblance to the cars of the present type comprising the forward seat 10, rear seat 11, extra seat 12 and the side walls 13 which side walls are provided with the usual doors 14. The lower portion of the side walls at the rear of the car extends beyond the back of the rear seat and forms a semi-circular chamber which is provided with the doors 15 and cover 16, which chamber extends under the rear seat and is sufficiently large to receive extra tires or the like. The doors are provided with racks 17 and 18 to receive periodicals or the like and the rear walls of the forward seats are provided with cabinets 19. The rear seat 11 is provided with the arm rests 20 which arm rests are provided with a hinged panel 21 which carries a miniature electric light bulb 22 which is concealed when the panel 21 is folded as to form a smooth arm rest.

The driver's seat 23 is arranged to slide rearwardly so that the side wheel thereof which constitutes the closure for the opening 24 in the side of the car may open said passage when said seat is slid to its rearward limit to permit the driver to pass therethrough. The seat is so constructed that it may slide upon guides 25 carried by the body of the car or, in other words, one of said guides is secured to the floor of the car adjacent to the side wall while the other is mounted upon a strip 26 carried by the middle partition 27 in the forward seat. The frame of the seat is provided with the anti-friction rollers 28 which are adapted to operate in the guides 25 and I have only shown the rollers engaging the guide carried by the partition but the guide secured to the floor receives similar rollers carried by the side wall of the seat above the same. The edge of the side wall surrounding the opening 24 is provided with a strap of metal 29 to protect the same and said strap of iron toward the forward end of the body is formed into a bracket 30. The wall of the car in advance of the opening 24 is provided with a strip 31 the purpose of which is to limit the forward movement of the seat.

I am aware that various modifications may be made within the scope of my invention and

Having thus fully described my invention, I claim:—

1. In a vehicle body, a rigidly secured forward and rear seat, side walls inclosing said seats, one of said walls having a permanent opening therethrough, a slidable seat between said forward rigidly secured seat and said opening in the side wall, and said seat slidable rearwardly to expose said opening.

2. In a vehicle body, a rigidly secured forward and rear seat, side walls inclosing said seats, said side walls continuing beyond the rear seat, to form a chamber, doors in said side walls, racks formed in some of said doors, one of said side walls having a permanent opening therein, a slidable seat between said forward rigidly secured seat and said opening in the side walls and said seat exposing said opening in its rearward movement.

3. In a vehicle body comprising a platform and side wall thereabout, a rigidly secured seat and a rearwardly slidable seat which is abreast of said rigidly secured seat in the limit of its forward movement, said side wall having an opening therein which opening is closed by said slidable seat in its forward movement, and said slidable seat exposing said opening to permit a passenger to alight from said car through said opening in its rearward movement.

In testimony whereof I affix my signature in presence of two witnesses.

GUY B. RADFORD.

Witnesses:
 HUGO MOCK,
 GEORGE L. THOM.